US011025186B2

(12) United States Patent
Lähteenmäki et al.

(10) Patent No.: US 11,025,186 B2
(45) Date of Patent: Jun. 1, 2021

(54) ELECTRIC LINEAR MOTOR, ELEVATOR AND METHOD FOR CONTROLLING ROTATION OF A MOVER WITH RESPECT TO A STATOR BEAM OF AN ELECTRIC LINEAR MOTOR

(71) Applicant: KONE Corporation, Helsinki (FI)

(72) Inventors: Jussi Lähteenmäki, Helsinki (FI); Tuukka Korhonen, Helsinki (FI); Tero Purosto, Helsinki (FI); Tero Hakala, Helsinki (FI)

(73) Assignee: KONE CORPORATION, Helsinki (FI)

( * ) Notice: Subject to any disclaimer, the term of this patent is extended or adjusted under 35 U.S.C. 154(b) by 7 days.

(21) Appl. No.: 16/690,409

(22) Filed: Nov. 21, 2019

(65) Prior Publication Data
US 2020/0195182 A1   Jun. 18, 2020

(30) Foreign Application Priority Data
Dec. 14, 2018 (EP) ..................................... 18212512

(51) Int. Cl.
*H02P 23/14* (2006.01)
*H02P 25/064* (2016.01)
*B66B 1/30* (2006.01)
*B66B 11/04* (2006.01)
*H02K 16/00* (2006.01)

(52) U.S. Cl.
CPC .............. *H02P 23/14* (2013.01); *B66B 1/308* (2013.01); *B66B 11/0407* (2013.01); *H02K 16/00* (2013.01); *H02P 25/064* (2016.02)

(58) Field of Classification Search
CPC ................................. H02P 23/14; H02K 16/00

USPC .................................................... 318/135, 34
See application file for complete search history.

(56) References Cited

U.S. PATENT DOCUMENTS 6,864,602 B2 *   3/2005   Korenaga ............ H02K 41/031
                                              310/12.24

FOREIGN PATENT DOCUMENTS

| EP | 3367068 A1 | 8/2018 |
| EP | 3373428 A1 | 9/2018 |
| EP | 3403966 A1 | 11/2018 |

(Continued)

OTHER PUBLICATIONS

Search Report issued in European priority application 18212512.0, dated Apr. 4, 2019.

*Primary Examiner* — David Luo
(74) *Attorney, Agent, or Firm* — Birch, Stewart, Kolasch & Birch, LLP

(57) ABSTRACT

An electric linear motor, an elevator and a method for controlling rotation of a mover with respect to a stator beam are presented. The electric linear motor includes a number of stator beams, wherein at least one of the stator beams includes a plurality of stators extending in a longitudinal direction of the stator beam, a number of movers, wherein at least one of the movers includes a plurality of armatures, wherein each one of the armatures is adapted for establishing an electromagnetic coupling with a corresponding one of the stators for moving the mover along said stator, and wherein at least one of the armatures is arranged to be offset from the aligned position with respect to the corresponding one of the stators in a perpendicular direction relative to the longitudinal direction.

22 Claims, 8 Drawing Sheets

(56) References Cited

FOREIGN PATENT DOCUMENTS

| WO | WO 2015/084366 A1 | 6/2015 |
| WO | WO 2016/207136 A1 | 12/2016 |

\* cited by examiner

ELECTRIC LINEAR MOTOR, ELEVATOR AND METHOD FOR CONTROLLING ROTATION OF A MOVER WITH RESPECT TO A STATOR BEAM OF AN ELECTRIC LINEAR MOTOR

FIELD OF THE INVENTION

The present invention relates in general to electric linear motors. In particular, however not exclusively, the present invention concerns controlling of the operation of electric linear motors.

BACKGROUND

Electric linear motors can be utilized in a variety of applications, such as in elevators to move the elevator car in the elevator shaft. Some typical electric linear motors are such that they have a long linear stator beam equipped with controllable electromagnetic components such as coils for generating magnetic field. The rotor, or "mover", typically comprises permanent magnets, magnetic fields of which, when being in electromagnetic engagement with the "traveling" magnetic field of the stator, causes the rotor to move along the linear stator.

However, some electric linear motors can be operated by feeding current to the windings in the mover in order to control the movement of the mover along the stator beam. In such motors, there may not be windings in the stator beam at all. In addition to the control of the movement along the stator beam, the current fed into the windings can be controlled such as to generate an air gap between the stator and the mover, that is, to magnetically levitate the mover with respect to the stator beam.

However, in the known solutions, there are challenges with controlling of the levitation in that the mover tends to rotate with respect to the stator beam, that is around the stator beam, thus in many cases causing mechanical contact between the mover and the stator beam. Therefore, there is still a need to develop electric linear motors utilizing magnetic levitation to generate the air gap of the motor.

SUMMARY

An objective of the present invention is to provide an electric linear motor, an elevator, and a method for controlling rotation of a mover with respect to a stator beam of an electric linear motor. Another objective of the present invention is that the electric linear motor, the elevator, and the method facilitate the controlling of the rotation of the mover with respect to the stator beam.

The objectives of the invention are reached by an electric linear motor, an elevator and a method as defined by the respective independent claims.

According to a first aspect, an electric linear motor is provided. The electric linear motor comprises at least one stator beam, wherein the at least one, preferably each one, stator beam comprises a plurality of stators, such as two or four, extending in a longitudinal direction of the stator beam. The electric linear motor further comprises at least one mover, wherein the at least one, preferably each one, mover comprises a plurality of armatures, such as comprising windings or three-phase windings into which current(s) may be injected. Furthermore, each one of the plurality of armatures is adapted for establishing an electromagnetic coupling or engagement with a corresponding one of the stators for moving the mover along said stator. At least one of the plurality of armatures is arranged to be offset from the aligned position with respect to the corresponding one of the stators in a perpendicular direction relative to the longitudinal direction. Said perpendicular direction may, preferably, be also in parallel with respect to a width of the corresponding stator, thus meaning that said armature and/or stator facing said armature is moved sideways from the aligned position.

The stator(s) may have a longitudinal direction, such as parallel relative to the longitudinal direction of the stator beam(s), a direction of the width of the stator, and a direction of the thickness of the stator, therefore, defining substantially three dimensions of the stator(s).

The aligned position refers herein to an arrangement in which the at least one of the plurality of armatures would be arranged to directly face, that is aligned with, the corresponding stator.

In an embodiment, the armature may comprise a winding.

In an embodiment, additionally or alternatively, the armature may comprise a permanent magnet. In a preferred embodiment, the armature may comprise a magnetic core, a winding and a permanent magnet.

The term "along said stator" refers herein to movement of the mover relative to said stator while having an air gap of the electric linear motor therebetween, that is, being near to and, preferably, in electromagnetic coupling or engagement with each other. Thus, there may, preferably, not be a mechanical contact between the mover and said stator at least during the movement. In some embodiments of the present invention, there may, however, be other components or elements, such as surfaces, of the mover and the stator beam, or components between the mover and the stator beam, which may be in mechanical contact with one another, such as guiding elements, even during the movement.

In preferable embodiments, the at least one of the plurality of armatures may be arranged offset from the aligned position, for example asymmetrically with respect to the corresponding stator, such that a torque component or components for rotating the mover in a first direction with respect to the stator beam, that is around a rotating axis oriented in the direction of the stator beam, is/are being generated when current(s) is/are injected to winding(s) therein. The torque component(s), therefore, allow the rotation of the mover to be controlled by controlling said current(s).

In various embodiments, at least one additional armature, preferably also comprising a winding, of the plurality of armatures may be arranged offset from the aligned position with respect to its corresponding one of the stators for generating a torque component for rotating the mover in a second direction with respect to the stator beam. The second direction may, preferable, be opposite with respect to the first direction.

In various embodiments, two of the plurality of armatures may be arranged at opposite sides of the stator beam. In some embodiments, said two of the plurality of armatures may be arranged offset with respect to the corresponding stators for generating torque components for rotating the mover with respect to the stator beam in same direction.

In various embodiments, the plurality of stators may comprise at least four stators and the plurality of armatures at least four armatures. In some embodiments, there may be four stators arranged on four sides of the stator beam. In such embodiments, the stator beam may have a cross-sectional shape of a polygon, a quadrangle, a square, or a parallelogram, for instance, thus, defining four sides of which specific two sides are opposite with respect to each other and specific other two sides are opposite with respect to each other.

In some embodiments, the stator beam may have a rounding shape in corners of the stator beam, such as, a substantially tubular shape.

Furthermore, the plurality of stators and the plurality of armatures may, preferably, be arranged with respect to each other for enabling a control of an air gap, that is a length of the air gap at at least one or several different positions, between the stator beam and the mover, for example, preferably, by magnetic levitation.

In various embodiments, two consecutive armatures of the plurality of armatures may be arranged offset to opposite directions with respect to their corresponding stator.

In various embodiments, the electric linear motor may comprise air gap regulation means for regulating movement of the mover in at least one of the following: a first direction with respect to the stator beam, a second direction with respect to the stator beam.

In addition or alternatively, the electric linear motor may comprise air gap regulation means that comprise a number of guide elements arranged for limiting rotation of the mover with respect to the stator beam at least in one direction while, preferably, allowing movement in a direction of the air gap, such as, a portion of the mover moving in a direction of a length of the air gap at the position of said portion. Thus, the mover may be allowed to move such that the length of the air gap changes. According to various embodiments, the number of guide elements may comprise at least one of the following: a guide surface, such as a low friction surface, a roller, a permanent magnet, an electromagnet.

According to a second aspect, an elevator is provided. The elevator comprises an electric linear motor comprising at least one stator beam, wherein the at least one, preferably each one, stator beam comprises a plurality of stators, such as two or four, extending in a longitudinal direction of the stator beam. The electric linear motor further comprises at least one mover, wherein at least one, preferably each one, mover comprises a plurality of armatures, such as comprising windings or three-phase windings. Furthermore, each one of the plurality of armatures is adapted for establishing an electromagnetic coupling or engagement with a corresponding one of the stators for moving the mover along said stator. At least one of the plurality of armatures is arranged to be offset from an aligned position with respect to the corresponding one of the stators in a perpendicular direction relative to the longitudinal direction. The elevator further comprises a number of elevator cars, and an elevator shaft, wherein the at least one stator beam is arranged to extend along the elevator shaft. Furthermore, the at least one mover is coupled to each one of the number of elevator cars, respectively, for moving the elevator car in the elevator shaft.

The electric linear motor of the elevator according to the second aspect may be in accordance with any embodiment of the electric linear motor according to the first aspect.

In various embodiments of the elevator, the electric linear motor may comprise a plurality of stator beams and a plurality of movers. In some embodiments, at least two, preferably four, of the movers may be coupled to same elevator car, that is, one elevator car may be coupled to more than one of the movers.

Alternatively or in addition, at least two of the movers may be arranged to be moved along different stator beams.

In various embodiments, the elevator may comprise a plurality of elevator cars, wherein each elevator car may have at least one of the movers being coupled to said elevator car for moving said elevator car in the elevator shaft.

According to a third aspect, a method for controlling rotation of a mover with respect to a stator beam of an electric linear motor is provided. The electric linear motor comprises a number of stator beams, wherein at least one of the number of stator beams comprises a plurality of stators extending in a longitudinal direction of the stator beam. The electric linear motor further comprises a number of movers, wherein at least one of the number of movers comprises a plurality of armatures. Each one of the plurality of armatures is adapted for establishing an electromagnetic coupling with a corresponding one of the stators for moving the mover along said stator. Furthermore, at least one of the plurality of armatures is arranged to be offset from an aligned position with respect to the corresponding one of the stators in a perpendicular direction relative to the longitudinal direction, such as also in parallel with respect to a width of the corresponding stator. The armature comprises a winding. The method comprises controlling currents of the at least one of the plurality of armatures, such as of the winding(s) thereof, by current controlling means for controlling the rotation of the mover with respect to the stator beam.

In some embodiments, the electric linear motor may comprise the at least one of the plurality of armatures arranged offset from the aligned position with respect to its corresponding one of the stators for generating a torque component for rotating the mover in a first direction with respect to the stator beam, and at least one additional armature, preferably comprising a winding, of the plurality of armatures is arranged offset with respect to its corresponding one of the stators for generating a torque component for rotating the mover in a second direction with respect to the stator beam. In such embodiments, the method may comprise controlling currents of windings of said one and said at least one additional armature by the current controlling means for controlling the rotation of the mover in the first and second directions.

In various embodiments, the electric linear motor may comprise two of the plurality of armatures arranged at opposite sides of the stator beam and offset from aligned positions for generating torque components for rotating the mover in same direction with respect to the stator beam. In such embodiments, the method may comprise controlling currents of windings of said two of the plurality of armatures by the current controlling means for controlling the rotation of the mover in the first or in the second direction.

Alternatively or in addition, the method may comprise controlling a direct component of the currents of windings for controlling the rotation of the mover, that is, the direct (d) axis component of the currents.

The present invention provides an electric linear motor, an elevator, and a method for controlling rotation of a mover with respect to a stator beam of an electric linear motor. The present invention provides advantages over known solutions such that by utilizing the electric linear motor according to an embodiment of the present invention it is possible to generate a rotational force or a torque component which can be controlled by controlling the current of the mover windings.

Various other advantages will become clear to a skilled person based on the following detailed description.

The expression "a number of" refers herein to any positive integer starting from one (1), that is, being at least one.

The expression "a plurality of" refers herein to any positive integer starting from two (2), that is, being at least two.

The terms "first", "second" and "third" are herein used to distinguish one element from other element, and not to specially prioritize or order them, if not otherwise explicitly stated.

The exemplary embodiments of the present invention presented herein are not to be interpreted to pose limitations to the applicability of the appended claims. The verb "to comprise" is used herein as an open limitation that does not exclude the existence of also un-recited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

DETAILED DESCRIPTION OF SOME EMBODIMENTS

Figure 1:
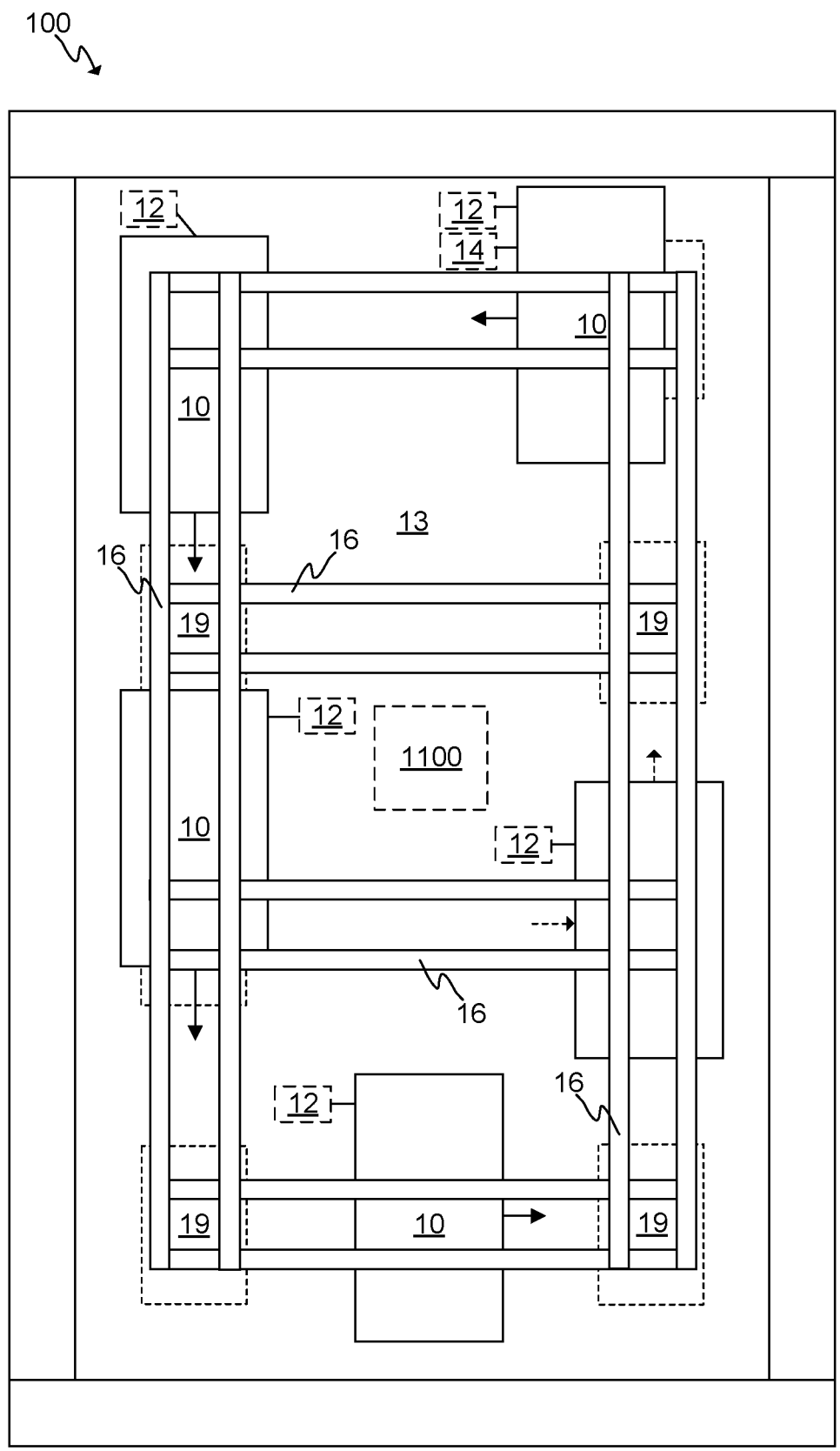
FIG. 1 illustrates schematically an elevator according to an embodiment of the present invention.

FIG. 1 illustrates schematically an elevator 100 according to an embodiment of the present invention. The elevator 100 may comprise at least one or a plurality of elevator cars 10 moving in the elevator shaft 13 or the elevator car pathway 13.

According to various embodiments, the elevator car(s) 10 may comprise a first electrical drive 12 or a drive unit 12, such as a frequency converter or an inverter, and/or a first energy storage 14 such as a battery or batteries, which are shown with dashed lines indicating the optionality of the feature.

The first electrical drive 12 may be utilized for operating a mover (not shown in FIG. 1) arranged to the elevator car 10 for moving the car 10 within the elevator shaft 13. There may also be other electrically operated equipment in the elevator car 10 such as lighting, doors, user interface, emergency rescue equipment, etc. The first electrical drive 12 or a further electrical drive, such as an inverter or a rectifier, may be utilized for operating one or several of said other equipment of the elevator car 10. The first energy storage 14 may, preferably, be electrically coupled to the first electrical drive 12, for example, to the intermediate circuit of the drive, for providing electrical power to the first electrical drive 12 and/or for storing electrical energy provided by the first electrical drive 12 or a further electrical drive or other electrical power source.

There may preferably be at least two landing floors, having landing floor doors 19 or openings 19, comprised in the elevator 100. There may also be doors comprised in the elevator car 10. Although in FIG. 1 it is shown that there are two horizontally separated sets, or "columns", of vertically aligned landing floors, there could as well be only one column as in conventional elevators or more than two, for example, three.

Regarding the elevator shaft 13, it may be such as defining substantially closed volume in which the elevator car 10 is adapted and configured to be moved. The walls may be, for example, of concrete, metal or at least partly of glass, or any combination thereof. The elevator shaft 13 herein refers basically to any structure or pathway along which the elevator car 10 or cars 10 are configured to be moved.

As can be seen in FIG. 1 with respect to the elevator 100, the elevator car 10 or cars 10 may be moved within the elevator shaft 13 along a stator beam 16 or beams 16 vertically and/or horizontally depending on the direction of the stator beams 16. According to various embodiments, the elevator car 10 or cars 10 may be configured to be moved along a number of vertical 16 and/or horizontal 16 and/or inclined stator beams, for example, two beams such as in FIG. 1. The stator beams 16 may be part of an electric linear motor of the elevator 100 utilized to move the elevator car 10 or cars 10 in the elevator shaft 13. The stator beams 16 may, preferably, be arranged in fixed manner, that is, stationary with respect to the elevator shaft 13, for example, to a wall of the shaft by fastening portions.

The elevator 100 may comprise an elevator control unit 1100 for controlling the operation of the elevator 100. The elevator control unit 1100 may be a separate device or may be comprised in the other components of the elevator 100 such as in or as a part of the first electrical drive 12. The elevator control unit 1100 may also be implemented in a distributed manner so that, e.g., one portion of the elevator control unit 1100 may be comprised in the first electrical drive 12 and another portion in the elevator car 10. The elevator control unit 1100 may also be arranged in distributed manner at more than two locations or in more than two devices.

The elevator control unit 1100 may comprise one or more processors, one or more memories being volatile or non-volatile for storing portions of computer program code and any data values and possibly one or more user interface units. The mentioned elements may be communicatively coupled to each other with e.g. an internal bus.

The processor may be configured to execute at least some portion of computer program code stored in the memory causing the processor, and thus the elevator control unit 1100, to perform desired tasks. The processor may thus be arranged to access the memory and retrieve and store any information therefrom and thereto. For sake of clarity, the processor herein refers to any unit suitable for processing information and control the operation of the elevator control unit 1100, among other tasks. The operations may also be implemented with a microcontroller solution with embedded software. Similarly, the memory is not limited to a certain type of memory only, but any memory type suitable for storing the described pieces of information may be applied in the context of the present invention.

According to an embodiment, the elevator shaft 13 may comprise electrical power means for providing electrical power to the elevator car 10. For example, a bus bar with vertically running connector rails. The connector rails may be connected to three phases of an AC mains network and one of the vertical connector rails may be a control connector connecting the elevator car 10 with the elevator control unit 1100, for instance. The elevator car 10 may comprise a contactor which may be pressed via a connector against the elevator car 10. Via the contactor, the elevator car 10 may be provided with electric power for the operation of the mover 20 as well as for all further car components needing electric power, as e.g. doors, input/output (I/O), lighting, etc. Alternatively, electrical power to elevator car 10 may be provided wirelessly, through split coils, based on inductive coupling. For example, the primary coil may be disposed in elevator shaft 13 and the secondary coil may be disposed on the elevator car 10.

Figure 2:
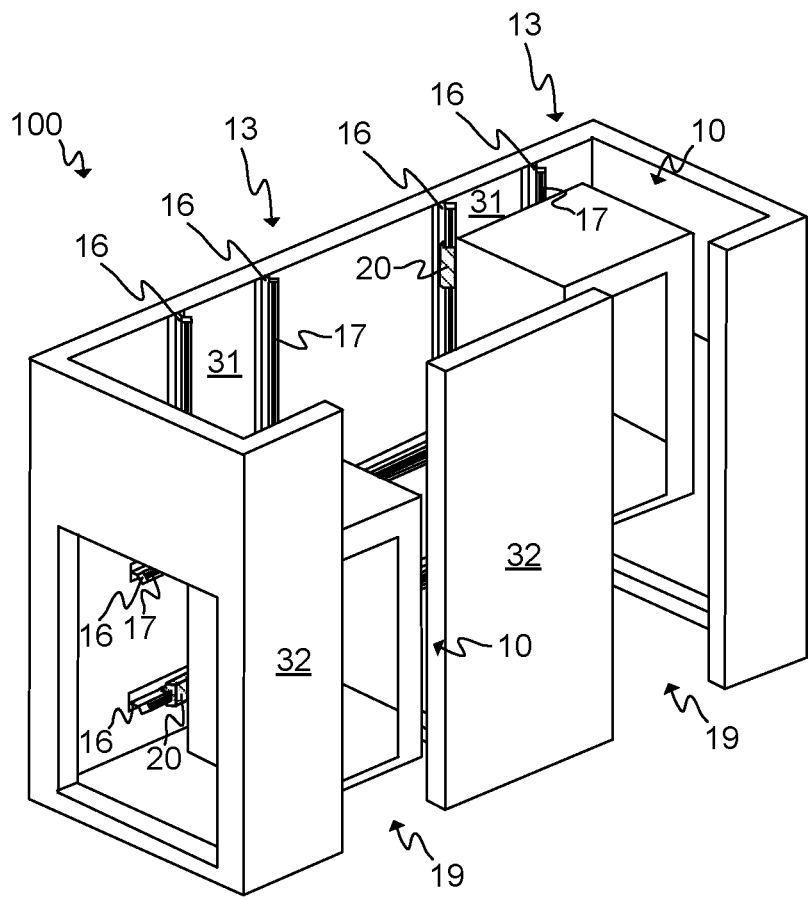
FIG. 2 illustrates schematically an elevator according to an embodiment of the present invention.

FIG. 2 illustrates schematically a part of an elevator 100 according to an embodiment of the present invention. There are two elevator cars 10 configured to be moved in the elevator shaft 13 by an electric linear motor. The electric linear motor may comprise a plurality of stators 17 comprised in a stator beam 16 or beams 16, in this case two. The stator beam 16 or beams 16 may be arranged vertically or horizontally, for example, in FIGS. 1 and 2 the elevator 100 comprises vertical stator beams 16 and horizontal stator beams 16. However, the stator beam 16 or beams 16 may also be arranged to any direction(s) in which the elevator car 10 is desired to be moved, that is, in an inclined direction. One stator beam 16 may comprise a plurality of stator beam parts arranged one after another to yield the desired length for the stator beam 16 in whole.

The mover 20 may, preferably, be a C-shaped or U-shaped (not shown). The mover 20 may, preferably, comprise at least one or several permanent magnets and/or magnetic core element(s) or ferromagnetic material, and optionally, a plurality of windings. The windings may, preferably, be comprised in the armature 22 of the mover 20 and adapted to face the stators 17 of the stator beam 16. However, in some embodiments, the mover 20 may comprise only one or several permanent magnets and/or magnetic core element(s) or ferromagnetic material, while the windings may reside in the stators 17 of the stator beam 16. The windings of the stator may thus enable forming of the controllable magnetic field for moving the mover 20 in electromagnetic engagement with the stator 17.

The windings, when comprised in the mover 20, may, preferably, be arranged to be in electromagnetic engagement with the stators 17 for moving the mover 20 along the stator beam 16. The mover 20 may be attached or coupled to the elevator car 10, for example, to the back wall of the car 10 such as shown in FIG. 2. The mover 20 may be shaped and designed in such a way as to enable the movement of the mover 20 along the stator beam 16 without interference from the fastening or support portions therein.

According to some embodiments, the stator beam 16 may comprise stators 17 on opposite sides of the stator beam 16. Said stators 17 may be, for example, two of the four stators 17. In a preferably embodiment, the stator beam 16 may comprise four stators 17 on each four side of the stator beam 16, the cross-sectional shape of which may, preferably, be a polygon, a quadrangle, a square, or a parallelogram, or the like, for instance, thus, defining four sides of which specific two sides are opposite with respect to each other and specific other two sides are opposite with respect to each other.

The movement of the mover 20 along the stator beam 16 may be implemented by known control methods, such as, field-oriented or vector control or the like. The basic idea is to produce an alternating magnetic field, for example by an electrical drive 12, by injecting current to the windings of the mover or the stator 17. The windings facing the mover 20 or the stator 17 then co-acts with the mover 20 or the stator 17, respectively, through the electromagnetic engagement or coupling, and produces a force which moves the mover 20 and thus the elevator car 10 along the stator beam 16.

The stator beam 16 or beams 16 may comprise a plurality of stators 17 extending substantially along the whole stator beam 16. There may, advantageously, be four stators 17 arranged at all four sides of the stator beam 16. There may also be a fastening portion or portions by which said part 16 may be attached in fixed manner to the structures, such as a wall, of the elevator shaft 13. The fastening portion 35 may also be a separate fastening portion which may then be attached to the stator beam 16 for arranging the stator beam 16 into the elevator shaft 13 or the fastening portion may be an integrated part of the stator beam 16 or a part thereof. The stators 17 may, preferably, be of ferromagnetic material and comprise teeth on their outer surface for providing a suitable magnetic circuit for co-acting with the mover 20, that is, magnetic teeth. According to a preferable embodiment of the present invention, the stator beam 16 or beams 16 are passive in the sense that they do not comprise controllable elements or components, such as coils, for controlling the movement of the mover 20 along the stator beam 16.

In FIG. 2, the stator beams 16 are arranged to the back wall 31 of the elevator shaft 13. It should be noted, however, that the elevator shaft 13 refers herein to the any elevator car pathway 13 which, as described above, may include vertical parts, horizontal parts, and/or parts having a third direction different with respect to vertical and horizontal directions, that is, an inclined direction. For example, the part of the elevator shaft 13 depicted in FIG. 2 comprises two vertical parts and one horizontal part.

In FIG. 2, the elevator shaft 13 or the elevator car pathway 13 may further comprise a front wall 32. The front wall 32 may, preferably, comprise an opening 19 for entering into the elevator car 10 or cars 10. Although shown in FIG. 2 that the opening 19 for entering the elevator cars 10 is arranged only at vertical parts of the elevator shaft 13, the opening 19 may as well be arranged to the horizontal part or any part of the elevator shaft 13. It should be noted, however, that the elevator shaft 13 may in some cases comprise only one wall or a structure arranged to accommodate the necessary equipment such as the stator beam 16. Thus, the elevator shaft 13 or the elevator car pathway 13 does not necessarily have to define a substantially closed volume, that is, surrounded by wall elements or glass or any other structures as long as there is at least a support structure to support the stator beam(s) 16.

The elevator 100, or particularly the elevator shaft 13 or shafts 13 thereof, according to the various embodiments of the present invention may comprise at least one, however, preferably more than one, positions for changing the direction of movement of the elevator car 10 at which the direction of movement of an elevator car 10 may be changed from one direction to another, which said another is unparallel relative to said one direction, for example, such as when changing the direction between the vertical and horizontal directions. In FIG. 2, there are shown two such positions. The changing of the direction at these positions may be implemented, for example, by rotatable stator beam parts and/or rotatable movers 20 coupled to the elevator car 10.

The mover 20 may, preferably, comprise armatures comprising winding(s) that may be arranged around, for example, magnetic teeth arranged to the armature of the mover 20, for example, for three-phase current injection by an electrical drive 12, and may, optionally, also comprise permanent magnets and/or ferromagnetic material or mover irons. The windings may be controlled, for example, by injecting three-phase current having a phase shift of 120 degrees between two phases. The current in the windings may be controlled, as stated hereinbefore, by an electrical drive 12 such as a frequency converter or an inverter. If an electrical energy storage 14, such as a battery, coupled to the elevator car 10 is being utilized, the electrical drive 12, such as a frequency converter, may draw electrical power from the storage to convert the direct current (DC) of the battery to suitable alternating current (AC) for the mover 20 to be moved along the stator beam 16.

Figure 3:
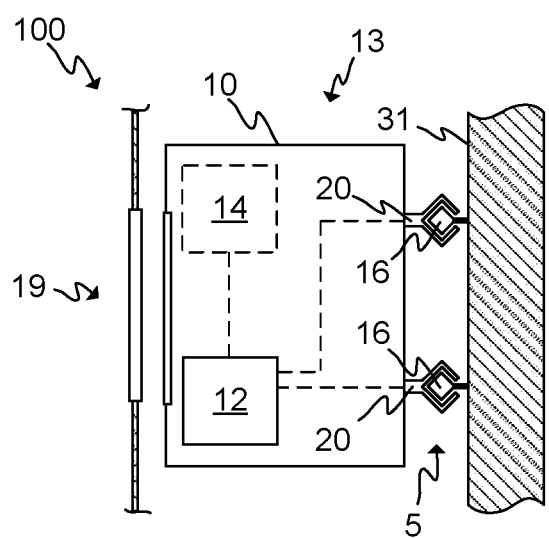
FIG. 3 illustrates schematically an elevator according to an embodiment of the present invention.

FIG. 3 illustrates an elevator 100 according to an embodiment of the present invention. The elevator 100 may comprise two stator beams 16, advantageously, arranged parallel to each other, however, it is clear that there could be three or four or even more stator beams 16. The same applies to the number of movers 20 configured to be moved relative to a corresponding stator beam 16 as described hereinabove.

In FIG. 3, the mover 20 has a C-shape. The mover 20 may, preferably, comprise a plurality of armatures comprising windings, and, optionally, at least one or several permanent magnets and/or magnetic core element(s) or ferromagnetic material. The armatures may, preferably, be comprised in the mover 20 and adapted to face the stators 17 of the stator beam 16.

The operation of the linear electric motor 5 may be controlled by an electrical drive 12 or a plurality of electrical drives 12, such as a frequency converter or converters or an inverter or inverters. There may be a separate elevator control unit 1100 or it may be comprised, at least partly, in the electrical drive 12. There may be one electrical drive 12 for controlling one mover or several drives 12 controlling one mover depending on the structure and configuration of the mover 20 in question, for example, a mover 20 comprising one or several controllable electromagnetic components such as windings. In addition, electrical power for operating the electrical drive 12 or drives 12 may be drawn from the electrical energy storage 14 of the elevator car 10.

Figure 4A:
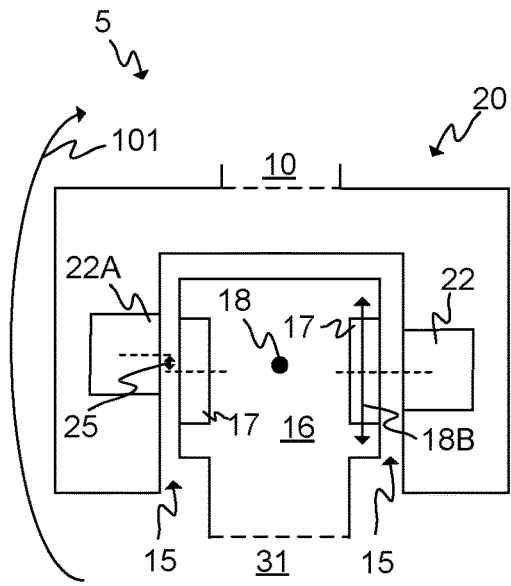
FIGS. 4A and 4B illustrate schematically electric linear motors according to some embodiments of the present invention.
Figure 4B:
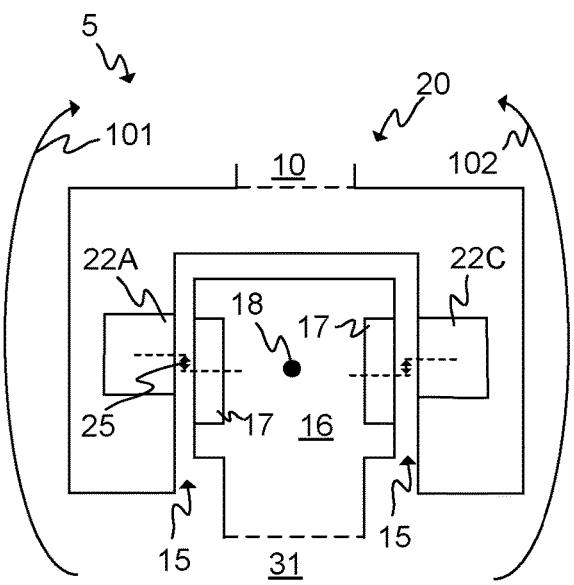
Figure 5:
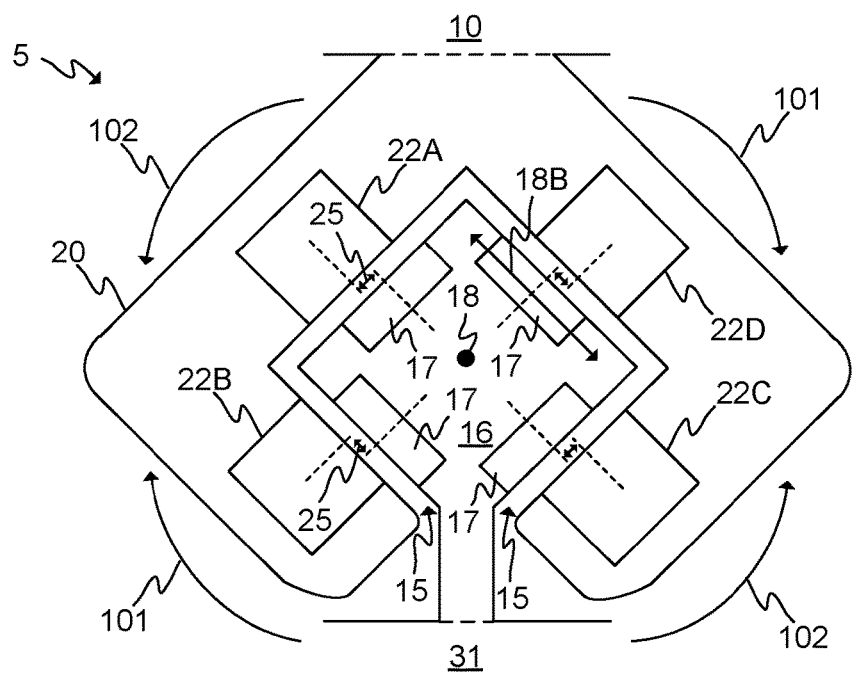
FIG. 5 illustrate schematically an electric linear motor according to an embodiment of the present invention.

FIGS. 4A and 4B illustrate schematically electric linear motors 5 according to some embodiments of the present invention. The electric linear motors 5 may comprise a number of stator beams 16, such as one or two or more, wherein at least one of the number of stator beams 16 comprises a plurality of stators 17, such as two or four, extending in a longitudinal direction 18 of the stator beam 16. The longitudinal direction has been marked in FIGS. 4A-5 with a number 18 and the direction away or towards the viewer. The direction 18B of the width of the stator 17 is also shown in FIGS. 4A and 5. This applies also in FIGS. 4B, 6-10 and 12-14 although not explicitly mentioned herein in connection with said figures. Furthermore, the electric linear motor 5 may comprise a number of movers 20, such as from one to more than ten or even twenty, wherein at least one of the number of movers 20 comprises a plurality of armatures 22. The armature(s) 22, 22A-22D may, preferably, comprise a winding or windings, such as a three-phase winding, and, optionally, a magnetic core of the armature 22, 22A-22D. Still further, the armature 22, 22A-22D may additionally comprise a permanent magnet or magnets.

Furthermore, each one of the plurality of armatures 22 may be adapted for establishing an electromagnetic coupling or engagement with a corresponding one of the stators 17 for moving the mover 20 along said stator 17. In addition, at least one of the plurality of armatures 22 is arranged to be offset 25 from aligned position with respect to the corresponding one of the stators 17 in a perpendicular direction relative to the longitudinal direction 18. In addition, the plurality of stators and the plurality of armatures may preferably be arranged with respect to each other for enabling a control of an air gap between the stator beam and the mover, for example, preferably, by magnetic levitation.

In FIG. 4A, one of the plurality of armatures, marked with reference number 22, has been arranged into the aligned position with respect to the corresponding one of the stator 17.

FIG. 4A illustrates an electric linear motor 5 comprising one armature 22 arranged to be offset 25 with respect to its corresponding stator 17. The at least one of the plurality of armatures 22 may be arranged offset such that a torque component for rotating the mover in a first direction 101 with respect to the stator beam 17 is being generated when current is injected to said offset armature 22.

FIG. 4B illustrates an electric linear motor 5 comprising two armatures 22 arranged to be offset 25 from aligned position with respect to their corresponding stators 17. In FIG. 4B, at least one additional armature of the plurality of armatures 22 is arranged offset with respect to its corresponding one of the stators 17 for generating a torque component for rotating the mover in a second direction 102 with respect to the stator beam 16.

According to various embodiments, two of the plurality of armatures 22 may be arranged at opposite sides of the stator beam 16, such as illustrated in FIGS. 4A and 4B.

According to various embodiments, the two of the plurality of armatures 22 may be arranged offset for generating torque components for rotating the mover with respect to the stator beam in opposite directions, such as armatures 22A and 22B shown in FIG. 4B.

FIG. 5 illustrates schematically an electric linear motor 5 according to an embodiment of the present invention. The electric linear motor 5 may comprise a number of stator beams 16, such as one or two or more, wherein at least one of the number of stator beams 16 comprises a plurality of stators 17, such as four as shown in FIG. 5, extending in a longitudinal direction 18 of the stator beam 16. Furthermore, the electric linear motor 5 may comprise a number of movers 20, such as from one to more than ten or even twenty, wherein at least one of the number of movers 20 comprises a plurality of armatures 22, such as four as shown in FIG. 5. Furthermore, each one of the plurality of armatures 22 may be adapted for establishing an electromagnetic coupling or engagement with a corresponding one of the stators 17 for moving the mover 20 along said stator 17. In addition, at least one of the plurality of armatures 22 is arranged to be offset 25 with respect to the corresponding one of the stators 17 in a perpendicular direction relative to the longitudinal direction 18. In addition, the plurality of stators and the plurality of armatures may preferably be arranged with respect to each other for enabling a control of an air gap between the stator beam and the mover, for example, preferably, by magnetic levitation.

According to various embodiments, the two of the plurality of armatures 22 may be arranged offset 25 for generating torque components for rotating the mover with respect to the stator beam in same direction, such as armatures 22A and 22C, and armatures 22B and 22D, respectively, shown in FIG. 5.

According to various embodiments, two consecutive armatures 22, such as 22A and 22B, or 22A and 22D, or 22D and 22C, of the plurality of armatures 22 may be arranged offset 25 to opposite directions with respect to their corresponding stator, as shown in FIGS. 4B and 5.

Figure 6:
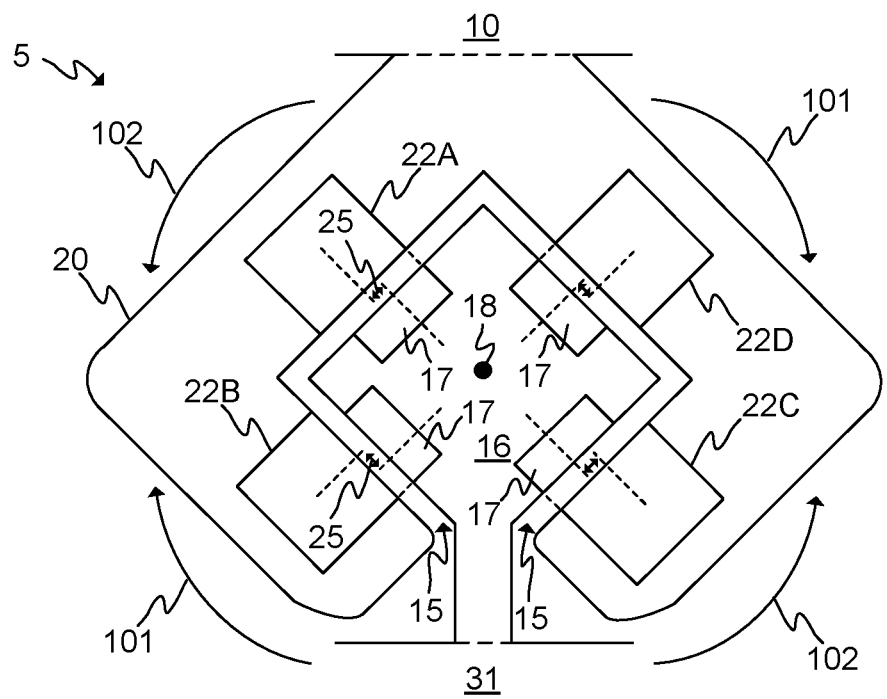
FIG. 6 illustrate schematically an electric linear motor according to an embodiment of the present invention.

FIG. 6 illustrates schematically an electric linear motor 5 according to an embodiment of the present invention. The electric linear motor 5 in FIG. 6 is substantially similar to one shown in FIG. 5, however, in FIG. 6 the stator 17 or stators 17 have a reduced width of the stator 17 or stators 17. This is emphasized in FIG. 6 by the dashed line in the air gap 15 indicating that the edges of the armatures 22A-22D and the stators 17 align at the other end. The offsetting 25 may still be provided similarly as in FIG. 5. However, the edge of the armatures 22A-22D (or armatures in FIGS. 13 and 14) does not have to align with the edge of the stator(s) 17 having the reduced width.

Stator 17 or stators 17 having the reduced width, such as shown in FIG. 6, may be utilized in connection with various embodiments of the present invention, for example, in connection with ones illustrated in FIGS. 7-10 and FIGS. 12-14.

Figure 7:
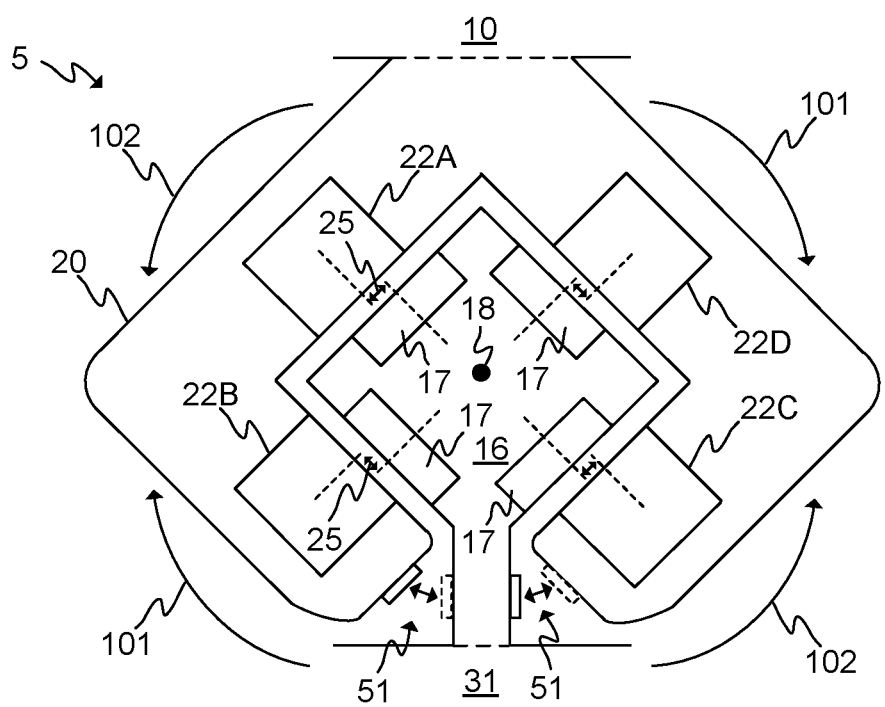
FIG. 7 illustrate schematically an electric linear motor according to an embodiment of the present invention.

FIG. 7 illustrates schematically an electric linear motor 5 according to an embodiment of the present invention. The electric linear motor 5 in FIG. 7 is substantially similar to one shown in FIG. 5, however, FIG. 7 additionally illustrates means for determining position of the mover 20 with respect to the stator beam 16. In the embodiment shown in FIG. 7, the means comprise proximity sensors 51, such as an inductive proximity sensor. The electric linear motor 5 may comprise one or several sensors arranged for determining the position, such as at various positions of the mover 20 and/or stator beam 16. Furthermore, in some embodiments, the means may comprise only one element, such as a distance sensor for measuring the distance between the sensor and a surface, for example, a surface of the stator beam 16 when the sensor is arranged to the mover 20. The means may in some embodiments comprise two elements, such as transmitting element and a receiving element of the means. The sensor for measuring the position of the mover 20 with respect to the stator beam 16 from the rotation point of view may be arranged as in FIG. 7, that is outside the air gap 15, or alternatively into the air gap 15.

In various embodiments, the elevator 100 and/or elevator car 10 may be configured to control the current fed into the armatures 22; 22A-22D, that is winding(s) therein, based on the signal received from the means for determining position of the mover 20 with respect to the stator beam 16. Preferably, the current may be controlled, such as by the first electrical drive 12, to affect the magnitude of the torque(s) generated by the offset armature(s), such as for rotating the mover 20 in the first 101 and/or the second 102 direction. In preferable embodiments, the controlling the current(s) comprises controlling a direct component of the current(s) for controlling the rotation of the mover 20, that is, the direct (d) axis component of the currents.

Figure 8:
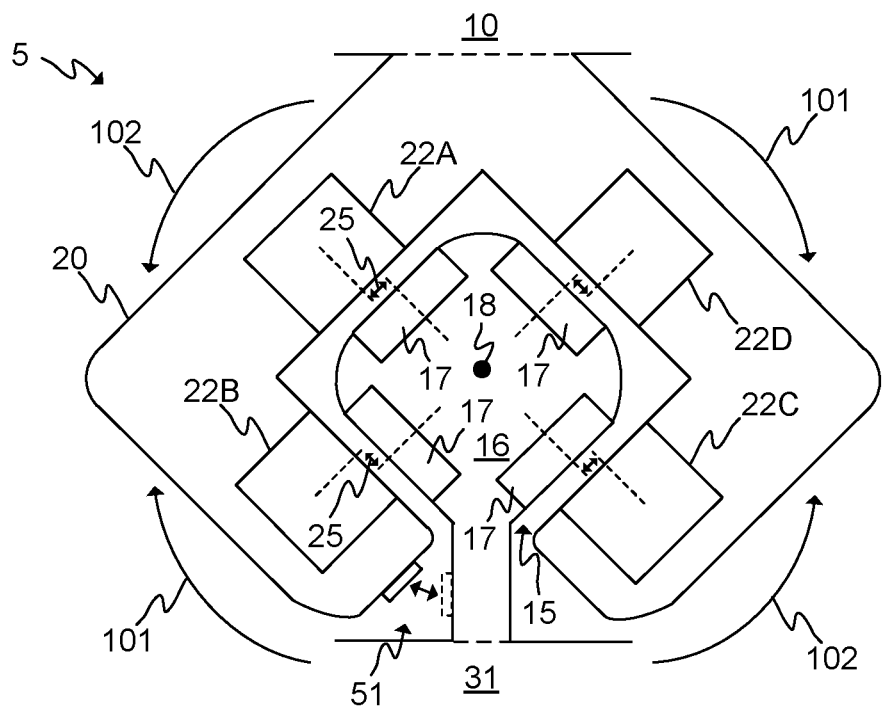
FIG. 8 illustrates schematically an electric linear motor according to an embodiment of the present invention.

FIG. 8 illustrates schematically an electric linear motor 5 according to an embodiment of the present invention. The electric linear motor 5 in FIG. 8 is substantially similar to one shown in FIG. 5, however, the stator beam 16 has a rounding shape in corners of the stator beam 16, such as a substantially tubular shape. The tubular shape allows more rotation of the mover 20 with respect to the stator beam 16 without the two coming in contact with one another in the air gap 15. In various embodiments, the mover 20 may also include rounding shapes on the surface facing the stator beam 16.

According to various embodiments, the electric linear motor 5 may comprise air gap regulation means for regulating movement of the mover 20 in at least one of the following: a first direction with respect to the stator beam, a second direction with respect to the stator beam. In various embodiments, the air gap regulation means may include means which limit the rotation in one of the directions, that is, such means remain passive during times when the rotation of mover 20 is within some predefined range, such as less than five or ten degrees, for instance, relative to the intended or unrotated position of the mover 20 with respect to the stator beam 16, such as shown in FIGS. 4A-8. Alternatively or in addition, the air gap regulation means may include means which fix the mover 20 relative to the stator beam 16 at one position.

In some embodiments, the air gap regulation means may comprise a number of guide elements arranged for regulating rotation of the mover with respect to the stator beam at least in one direction. The number of guide elements 71 may comprise at least one of the following: a guide surface 72, such as a low friction surface, a roller 73, a permanent magnet 81, an electromagnet 81.

Figure 9:
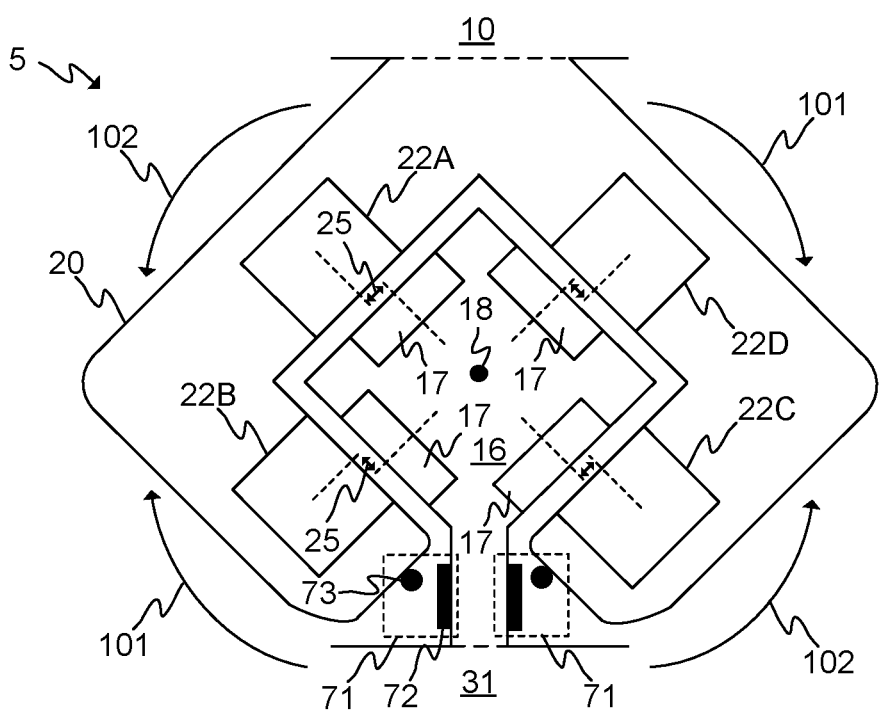
FIG. 9 illustrates schematically an electric linear motor according to an embodiment of the present invention.

FIG. 9 illustrates schematically an electric linear motor 5 according to an embodiment of the present invention. The electric linear motor 5 in FIG. 9 is substantially similar to one shown in FIG. 5, however, the motor 5 further comprises guide elements 71 arranged to limit or regulate the rotation of the mover 20 at least in one direction or in two directions. The motor 5 in FIG. 9 comprises guide surfaces 72 and/or a rollers 73 arranged between the edge of the mover 20 and the fastening portion or the edge of the stator beam 16. The tubular shape allows more rotation of the mover 20 with respect to the stator beam 16 without the two coming in contact with one another. In various embodiments, the mover 20 may also include rounding shapes on the surface facing the stator beam 16.

Figure 10:
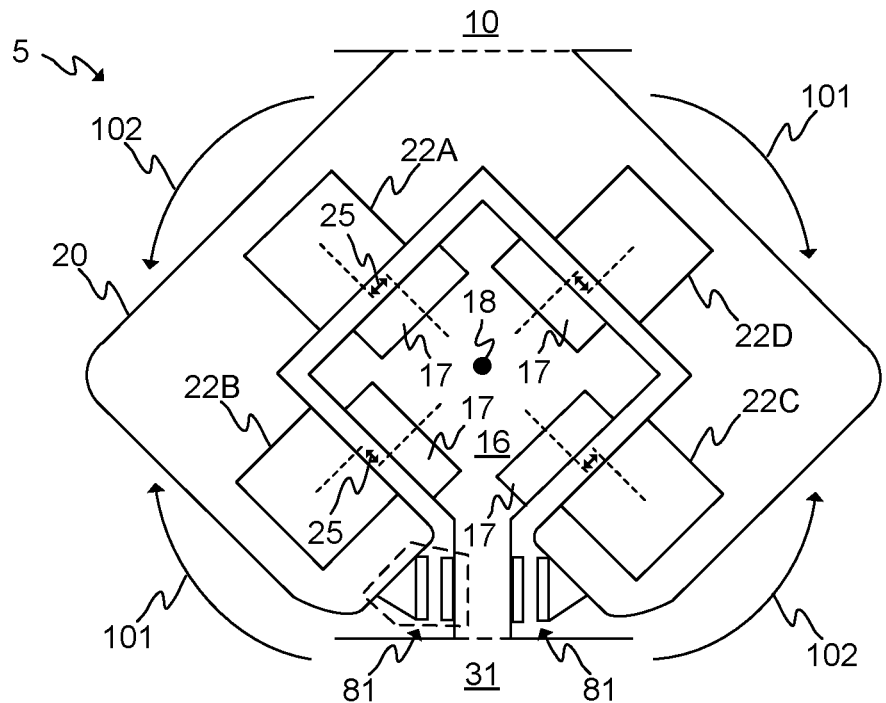
FIG. 10 illustrates schematically an electric linear motor according to an embodiment of the present invention.

FIG. 10 illustrates schematically an electric linear motor 5 according to an embodiment of the present invention. The electric linear motor 5 in FIG. 10 is substantially similar to one shown in FIG. 5, however, the motor 5 further comprises guide elements arranged to limit or regulate the rotation of the mover 20 at least in one direction or in two directions. The motor 5 in FIG. 10 comprises a permanent magnet(s) 81, such as a permanent magnet array, or an electromagnet(s) 81 arranged between the edge of the mover 20 and the fastening portion or the edge of the stator beam 16. In various embodiments, the permanent magnets 81 may, preferably, be arranged both on to the mover side and on to the stator beam side such that poles of the facing magnets are in opposite directions in order to achieve passive guidance for limiting or regulating the movement of the mover 20 with respect to the stator beam 16.

Figure 11:
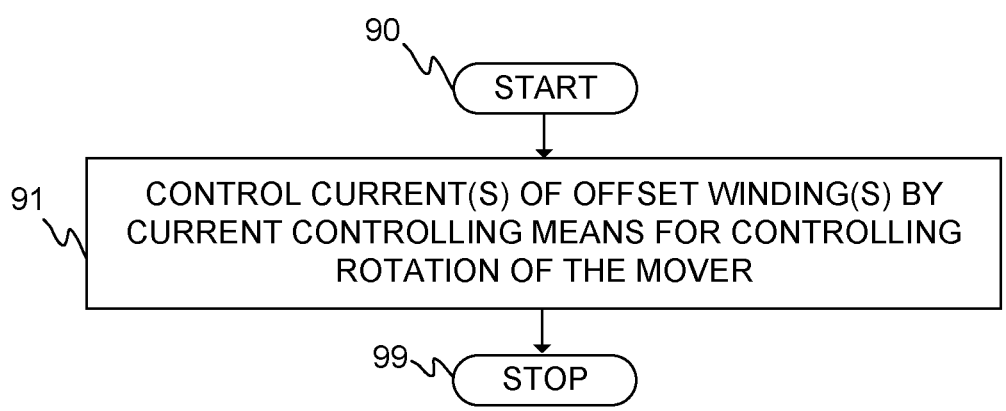
FIG. 11 illustrates a flow diagram of a method according to an embodiment of the present invention.

FIG. 11 illustrates a flow diagram of a method according to an embodiment of the present invention.

Step 90 refers to a start-up phase of the method. Suitable equipment and components may be obtained and systems assembled and configured for operation. For example, an electric linear motor 5 may be obtained and assembled for use. The motor 5 may comprise a number of stator beams 16, wherein at least one of the number of stator beams 16 comprises a plurality of stators 17 extending in a longitudinal direction 18 of the stator beam, and a number of movers 20, wherein at least one of the number of movers comprises a plurality of armatures 22, wherein each one of the plurality of armatures 22 is adapted for establishing an electromagnetic coupling with a corresponding one of the stators 17 for moving the mover 20 along the corresponding one of the stators. The motor 5 may further comprise at least one of the plurality of armatures 22A-22D that may be arranged to be offset 25 from aligned position with respect to the corresponding one of the stators 17 in a perpendicular direction relative to the longitudinal direction 18.

Step 91 refers to controlling currents of winding(s) of the at least one of the plurality of armatures, that is the offset armature(s), by current controlling means, such as by the first electrical drive 12, for controlling the rotation of the mover 20 with respect to the stator beam 16.

According to an embodiment, the electric linear motor 5 may comprise one of the plurality of armatures 22; 22A-22D arranged offset 25 with respect to its corresponding one of the stators 17 for generating a torque component for rotating the mover in a first direction 101 with respect to the stator beam 16, and at least one additional armature 22A-22D of the plurality of armatures 22 is arranged offset 25 with respect to its corresponding one of the stators for generating a torque component for rotating the mover 20 in a second direction 102 with respect to the stator beam 16, wherein the method the comprises controlling currents of said one 22A-22D and said at least one additional armature 22A-22D by the current controlling means, such as the first electrical drive 12, for controlling the rotation of the mover 20 in the first 101 and second 102 directions.

In some embodiments, the electric linear motor 5 may comprise two of the plurality of armatures arranged at opposite sides of the stator beam 16 and offset 25 for generating torque components for rotating the mover 20 in same direction with respect to the stator beam 16, and wherein the method may comprise controlling currents of said two 22A-22D of the plurality of armatures 22 by the current controlling means for controlling the rotation of the mover in the first 101 or in the second 102 direction.

In various embodiments, the method may comprise controlling a direct component of the currents for controlling the rotation of the mover 20.

Method execution is stopped at step 99. The method may be performed continuously, intermittently, or when needed, for instance.

Figure 12:
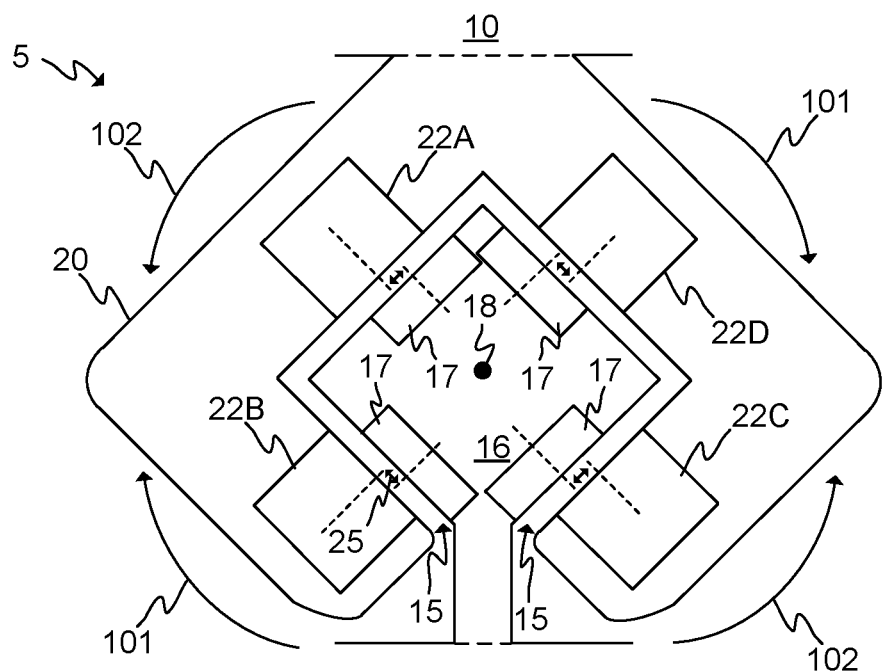
FIG. 12 illustrates schematically an electric linear motor according to an embodiment of the present invention.

According to various embodiments, such as shown in FIG. 12, the electric linear motor 5 may comprise a number of stator beams 16, wherein at least one of the number of stator beams 16 comprises a plurality of stators 17 extending in a longitudinal direction 18 of the stator beam 16, and a number of movers 20, wherein at least one of the number of movers 20 comprises a plurality of armatures 22. Furthermore, each one of the plurality of stators 17 may be adapted for establishing an electromagnetic coupling with a corresponding one of the armatures 22 for moving the mover 20 along said stator 17. Still further, alternatively with respect to embodiments in FIGS. 4A-9, at least one of the plurality of stators 17 may be arranged to be offset 25 with respect to the corresponding one of the armatures 22 in a perpendicular direction relative to the longitudinal direction 18. Thus, the at least one stator 17 or several stators 17 may be arranged to the stator beam 16 by displacing them from the center points while the armatures 22 of the mover 20 may be substantially at the center points of the mover 20. Moreover, the mover 20 may thus be substantially symmetrical from the point of view of the armature positions while the stator beam 16 may be asymmetrical with respect to the stator position(s).

Figure 13:
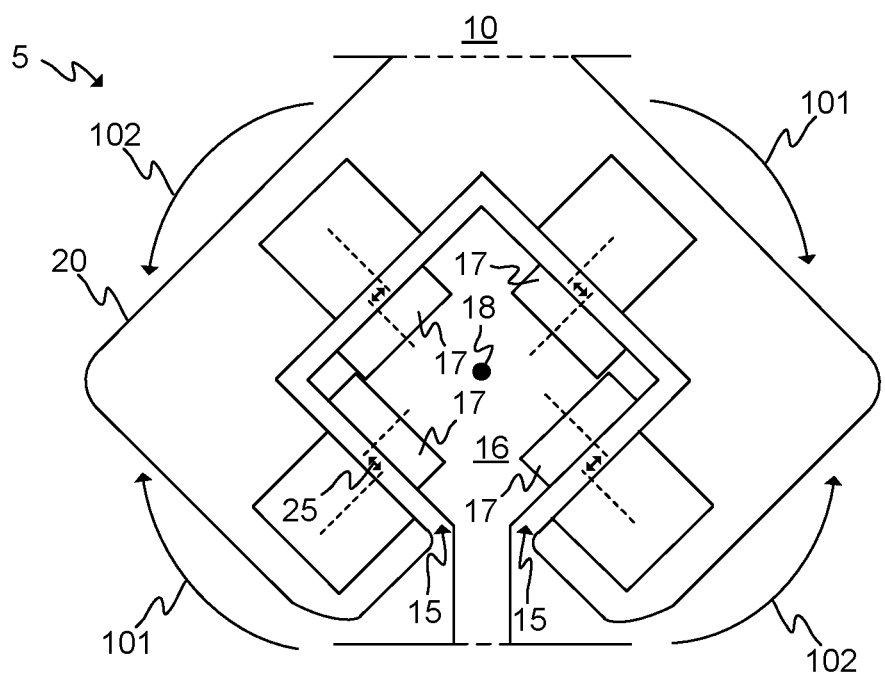
FIG. 13 illustrates schematically an electric linear motor according to an embodiment of the present invention.

According to still other embodiments, such as shown in FIG. 13, the electric linear motor 5 may comprise a number of stator beams 16, wherein at least one of the number of stator beams 16 comprises a plurality of stators 17 extending in a longitudinal direction 18 of the stator beam 16. The stators 17 may comprise stator windings. Furthermore, the electric linear motor 5 may comprise a number of movers 20, comprising armatures, wherein each armature may comprise a magnetic core and, optionally, a permanent magnet or magnets for defining magnetic teeth. Furthermore, each one of the plurality of stators 17 may be adapted for establishing an electromagnetic coupling with a corresponding one of the armatures for moving the mover 20 along said stator 17. Still further, at least one of the plurality of stators 17 comprising stator winding may be arranged to be offset 25 with respect to the corresponding one of the armatures in a perpendicular direction relative to the longitudinal direction 18. Thus, the at least one stator 17 or several stators 17 may be arranged to the stator beam 16 by displacing them from the center points while the armatures of the mover 20 may be substantially at the center points of the mover 20. Moreover, the mover 20 may thus be substantially symmetrical from the point of view of the armature positions while the stator beam 16 may be asymmetrical with respect to the stator position(s). In these embodiments, the rotation of the mover 20 with respect to the stator beam 16 may be controlled by controlling currents of the at least one of the plurality of stator windings by current controlling means for controlling the rotation of the mover 20 with respect to the stator beam 16.

Figure 14:
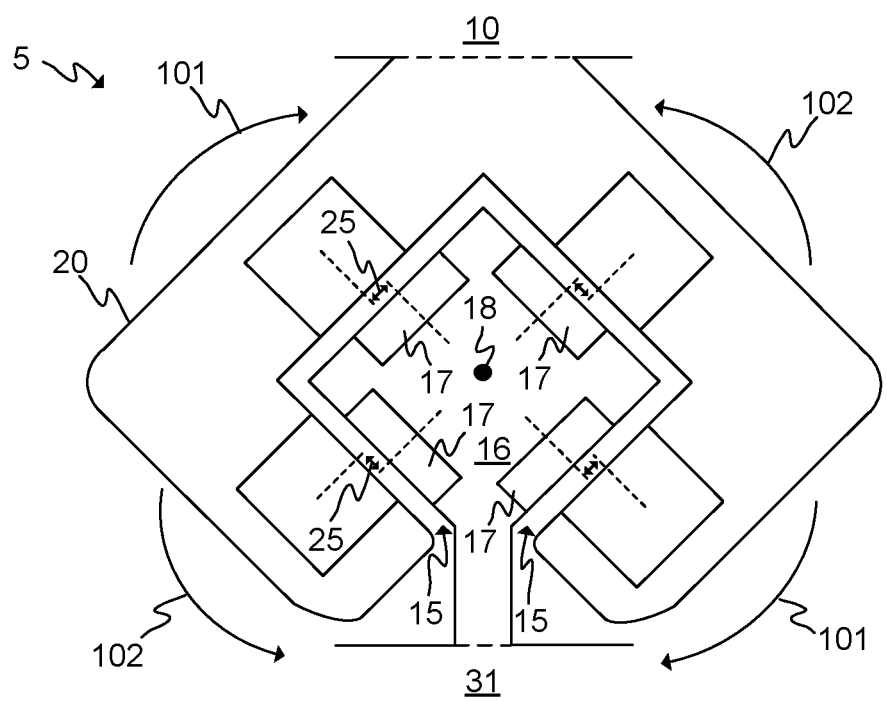
FIG. 14 illustrates schematically an electric linear motor according to an embodiment of the present invention.

According to still other embodiments, such as shown in FIG. 14, the electric linear motor 5 may comprise a number of stator beams 16, wherein at least one of the number of stator beams 16 comprises a plurality of stators 17 extending in a longitudinal direction 18 of the stator beam 16. The stators 17 may comprise stator windings. Furthermore, the electric linear motor 5 may comprise a number of movers 20, comprising armatures, wherein each armature may comprise a magnetic core and, optionally, a permanent magnet or magnets for defining magnetic teeth. Furthermore, each one of the plurality of stators 17 may be adapted for establishing an electromagnetic coupling with a corresponding one of the armatures for moving the mover 20 along said stator 17. Still further, at least one of the plurality of armatures may be arranged to be offset 25 with respect to the corresponding one of the stators 17 in a perpendicular direction relative to the longitudinal direction 18. Thus, at least one armature may be arranged to be offset 25 from aligned position with respect to the corresponding stator 17 in similar manner as shown in FIGS. 4A-10 with respect to the at least one of the plurality of armatures 22A-22D. In these embodiments, the rotation of the mover 20 with respect to the stator beam 16 may be controlled by controlling currents of the at least one of the plurality of stator windings by current controlling means for controlling the rotation of the mover 20 with respect to the stator beam 16.

In various embodiments comprising stator windings, such as in FIGS. 13 and 14, the electric linear motor 5 may otherwise be substantially similar to ones illustrated and described in connection with FIGS. 4A-10, however, the current controlling means, such as electrical drives, may be comprised in connection with the stator windings, such as arranged to the elevator shaft 13, instead of being arranged to the elevator car(s) 10.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An electric linear motor comprising:
at least one stator beam, wherein the at least one stator beam comprises a plurality of stators extending in a longitudinal direction of the stator beam; and
at least one mover, wherein the at least one mover comprises a plurality of armatures,
wherein each one of the plurality of armatures is adapted for establishing an electromagnetic coupling with a corresponding one of the plurality of stators for moving the mover along said stator, and
wherein at least one of the plurality of armatures is arranged to be offset from an aligned position with respect to the corresponding one of the plurality of stators in a perpendicular direction relative to the longitudinal direction of the corresponding stator, and in parallel with respect to a width of the corresponding stator.

2. The electric linear motor according to claim 1, wherein the armature comprises a winding.

3. The electric linear motor according to claim 2, wherein the at least one of the plurality of armatures is arranged to be offset from the aligned position with respect to the corresponding one of the plurality of stators such that a torque component for rotating the mover in a first direction with respect to the stator beam is generated when current is injected to the winding of said plurality of armatures.

4. The electric linear motor according to claim 2, wherein at least one additional armature of the plurality of armatures is arranged offset with respect to its corresponding one of the plurality of stators for generating a torque component for rotating the mover in a second direction with respect to the stator beam.

5. The electric linear motor according to claim 1, wherein the plurality of stators comprises at least four stators, and the plurality of armatures comprises at least four armatures.

6. The electric linear motor according to claim 1, wherein the plurality of stators and the plurality of armatures are arranged with respect to each other for enabling a control of an air gap between the stator beam and the mover.

7. The electric linear motor according to claim 6, wherein said two of the plurality of armatures are arranged offset for generating torque components for rotating the mover with respect to the stator beam in the same direction.

8. The electric linear motor according to claim 1, wherein two of the plurality of armatures are arranged at opposite sides of the stator beam.

9. The electric linear motor according to claim 1, wherein two consecutive armatures of the plurality of armatures are arranged offset from aligned positions to opposite directions with respect to their corresponding stator.

10. The electric linear motor according to claim 1, wherein the stator beam has a rounding shape in corners of the stator beam.

11. The electric linear motor according to claim 1, comprising an air gap regulator configured to regulate movement of the mover in at least one of the following: a first direction with respect to the stator beam, and a second direction with respect to the stator beam.

12. The electric linear motor according to claim 11, wherein the number of guides comprises at least one of the following: a guide surface, a roller, a permanent magnet, and an electromagnet.

13. The electric linear motor according to claim 1, comprising an air gap regulator configured to regulate movement of the mover, wherein the air gap regulator comprises a number of guides arranged for limiting rotation of the mover with respect to the stator beam at least in one direction while allowing movement in a direction of the air gap.

14. An elevator comprising:
the electric linear motor according to claim 1;
a number of elevator cars;
an elevator shaft, wherein at least one stator beam is arranged to extend along the elevator shaft; and
at least one mover coupled to each one of the number of elevator cars, respectively, for moving the elevator car in the elevator shaft.

15. The elevator according to claim 14, wherein the electric linear motor comprises a plurality of stator beams and a plurality of movers.

16. The elevator according to claim 15, wherein at least two of the movers are coupled to the same elevator car.

17. The elevator according to claim 15, wherein at least two of the movers are arranged to be moved along different stator beams.

18. The elevator according to claim 14, comprising a plurality of elevator cars, wherein each elevator car has at least one of the movers coupled to said elevator car for moving said elevator car in the elevator shaft.

19. A method for controlling rotation of a mover with respect to a stator beam of an electric linear motor, wherein the electric linear motor comprises a number of stator beams, wherein at least one of the number of stator beams comprises a plurality of stators extending in a longitudinal direction of the stator beam, and a number of movers, wherein at least one of the number of movers comprises a plurality of armatures, wherein each one of the plurality of armatures is adapted for establishing an electromagnetic coupling with a corresponding one of the plurality of stators for moving the mover along the corresponding one of the plurality of stators, and wherein at least one of the plurality of armatures is arranged to be offset from the aligned position with respect to the corresponding one of the plurality of stators in a perpendicular direction relative to the longitudinal direction of the corresponding stator, and in parallel with respect to a width of the corresponding stator, and wherein the armature comprises a winding, the method comprising:
controlling currents of the at least one of the plurality of armatures by a current controller configured to control the rotation of the mover with respect to the stator beam.

20. The method according to claim 19, wherein the electric linear motor comprises the at least one of the plurality of armatures arranged offset with respect to its corresponding one of the plurality stators for generating a torque component for rotating the mover in a first direction with respect to the stator beam, and at least one additional armature of the plurality of armatures is arranged offset with respect to its corresponding one of the plurality of stators for generating a torque component for rotating the mover in a second direction with respect to the stator beam, wherein the method comprises:

controlling currents of winding(s) of said one and said at least one additional armature by the current controller for controlling the rotation of the mover in the first and second directions.

21. The method according to claim 19, wherein the electric linear motor comprises two of the plurality of armatures arranged at opposite sides of the stator beam and offset for generating torque components for rotating the mover in the same direction with respect to the stator beam, wherein the method comprises:

controlling currents of windings of said two of the plurality of armatures by the current controller for controlling the rotation of the mover in the first or in the second direction.

22. The method according to claim 19, comprising controlling a direct component of the currents for controlling the rotation of the mover.

\* \* \* \* \*